United States Patent Office 3,637,904
Patented Jan. 25, 1972

3,637,904
MONOANHYDRIDE, OLEFIN-MALEIC ANHYDRIDE COPOLYMER, POLYEPOXIDE CASTING RESINS
Walter P. Barie, Jr., Shaler Township, Allegheny County, and Norman W. Franke, Penn Hills Township, Allegheny County, Pa., assignors to Gulf Research & Development Company, Pittsburgh, Pa.
No Drawing. Filed Dec. 18, 1969, Ser. No. 886,391
Int. Cl. C08g 45/04
U.S. Cl. 260—836                                11 Claims

ABSTRACT OF THE DISCLOSURE

New compositions of matter for forming castings made from a polyepoxide, a monoanhydride and a solid polyanhydride wherein the polyanhydride has at least three anhydride groups and the monoanhydride is soluble in the polyepoxide. The compositions are prepared by first mixing the monoanhydride and the polyepoxide and then adding the polyanhydride in a second stage to produce a clear homogeneous casting liquid.

This invention relates to thermo-curable epoxy resins, to a process for preparing them and to cast resins made from them. More particularly, this invention relates to epoxy resins made from a polyepoxide, a monoanhydride and a solid polyanhydride wherein the monoanhydride is soluble in the polyepoxide and the polyanhydride is a copolymer of an olefin and maleic anhydride.

It is well known that polyepoxides, both glycidyl and nonglycidyl, can be cured or hardened by the action of various anhydrides, as for example, phthalic anhydride, maleic anhydride, etc. Despite the prior art knowledge that various anhydrides, either with or without the aid of accelerators, are suitable as curing or hardening agents for polyepoxides, it is difficult to produce a satisfactory resin from a mixture of a polyepoxide and a polyanhydride obtained by the copolymerization of an olefin and maleic anhydride. Thus when a typical polyepoxide, a typical olefin-maleic anhydride copolymer and an accelerator are thoroughly mixed together at a temperature below the curing temperature, they tend to partially cure at the curing temperature to a rubbery, gel-like material which is incapable of further curing to a satisfactory product.

Accordingly, it is among the principal objects of this invention to provide a novel mixture comprising a polyepoxide and an olefin-maleic anhydride copolymer which can be fully cured to produce a clear, hard homogeneous casting.

It is another object of this invention to provide a method for fully curing mixtures comprising a polyepoxide and an olefin-maleic anhydride copolymer to produce clear, hard homogeneous castings.

It is a further object of our invention to provide clear, substantially fully cured cast resins comprising a polyepoxide and an olefin-maleic anhydride copolymer.

The foregoing objects and advantages as well as others which will become more apparent from the detailed description of the invention hereinafter set forth, are achieved in their fundamental aspects by using a monoanhydride which is soluble in the polyepoxide being cured in addition to the olefin-maleic anhydride copolymerized polyanhydride. In forming this three component mixture of the polyepoxide, monoanhydride and polyanhydride it is necessary to mix the polyepoxide with the monoanhydride in a first stage and then add the polyanhydride to this mixture in a second stage in order to produce a liquid suitable for casting.

Thus, in accordance with the present invention, a polyepoxide is intimately mixed with a monoanhydride which is soluble therein at about 20° to about 190° C. to form a clear, homogeneous mixture. We prefer to use a monoanhydride which is liquid at room temperature or slightly higher and we prefer to mix the polyepoxide and monoanhydride at a temperature between about 25° and about 100° C. The resulting mixture is then heated to a temperature of about 150° to 190° C. and the polyanhydride is then added. The resulting three component mixture is found to be a clear, homogeneous solution which may be heat cured to form a casting with the aid of an accelerator. We do not know why this two-stage, sequential addition of monoanhydride and polyanhydride to the polyepoxide results in a clear, homogeneous liquid which can be cast and fully cured to a hard, clear resin having excellent properties is successful. But we do know that this procedure is necessary when the olefin-maleic anhydride copolymer is used with a polyepoxide in a liquid casting system.

After the polyanhydride has been added to the polyepoxide-monoanhydride mixture, the clear solution is cooled below about 110° C. and a curing accelerator is added. The resulting solution is then ready for curing and, if desired, post curing. The curing step is normally carried out at a temperature of about 70° to 150° C. for a period of from a few hours to a few days. Post curing is generally carried out for a like period, but at higher temperatures, for example, about 180° to about 220° C.

Any of the polyepoxides well known in the art can be employed in the new compositions of this invention. By polyepoxide or epoxy resin is meant any molecule which contains on the average more than one epoxy group. An epoxy group is a three-membered ring containing one oxygen and two carbon atoms. The one oxygen in the three-membered ring is termed an "oxirane" oxygen atom. Thus, a polyepoxide is any compound containing on the average more than one oxirane oxygen atom. Polyepoxides having molecular weights between about 75 and 4000 are known. The liquid polyepoxides are preferred with the liquid aromatic type polyepoxides being more preferred.

These polyepoxides are well defined in U.S. Pat. No. 3,326,856 beginning at column 1, line 55 and extending to column 3, line 25, which disclosure is incorporated herein as a part of the present disclosure. The glycidyl ether type and cycloaliphatic polyepoxides are well known polyepoxides which are very useful herein. The glycidyl ethers of epichlorohydrin and bisphenol A are polyepoxides which are useful herein as well as being commercially available in large quantities at relatively modest cost.

The monoanhydrides which are suitable for use herein include substantially any monoanhydride which will aid in solubilizing the polyanhydride when the monoanhydride is admixed with the polyepoxide before the polyanhydride is added. The preferred monoanhydride compounds may be represented by the formula:

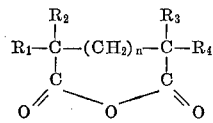

where the radicals $R_1$, $R_2$, $R_3$, and $R_4$ are independently hydrogen, halogen, hydrocarbon or substituted hydrocarbon radicals, and $n$ is zero or 1. Where $n$ is zero, the carbon atoms alpha to the carbonyl groups are joined to form a succinic anhydride group. One embodiment is that in which the radicals comprise one having a carbocyclic nucleus. Thus, the radicals $R_2$ and $R_3$, together with the alpha carbon atoms of the succinic anhydride nucleus, can be joined together to form a carbocyclic ring, such as one comprising six carbon atoms. The monoanhydride should be soluble and preferably readily soluble in the polyepoxide. Further, it should be relatively nonvolatile. Practically any cyclic monoanhydride of a dicarboxylic acid having 5 or more carbon atoms and having from 4 to 5 carbon atoms in the anhydride ring, to give succinic anhydride or glutaric anhydride groups, is useful according to the invention.

By the term "hydrocarbon radical" as used herein is meant any group of atoms consisting of carbon and hydrogen, such as alkyl, preferably saturated, having from 1 to about 18 carbon atoms, cycloalkyl, preferably saturated, having from 4 to about 12 or more carbon atoms, and aryl, alkaryl, and aralkyl having from 6 to about 12 or more carbon atoms. By the term "substituted hydrocarbon radical" is meant hydrocarbon radicals as defined above, but where one or more atoms therein have been exchanged for a halogen; —C≡N; —OR group where R is any hydrocarbon radical as defined above; or

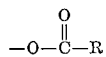

where R is any hydrocarbon radical as defined above. Examples of suitable monoanhydrides having the above formula are as follows: succinic anhydride, methylsuccinic anhydride, phenylsuccinic anhydride, orthotolylsuccinic anhydride, propylsuccinic anhydride, propenylsuccinic anhydride, hexylsuccinic anhydride, hexenylsuccinic anhydride, dodecylsuccinic anhydride, dodecenylsuccinic anhydride, methyltetrahydrophthalic anhydride, pentadecylsuccinic anhydride, glutaric anhydride, butylsuccinic anhydride, dioctylsuccinic anhydride, 1-bromo-2-heptylsuccinic anhydride, 1-bromo-2-phenylsuccinic anhydride, 1,2-dicarboxyliccyclopentane anhydride, 1,2-dicarboxyliccycloheptane anhydride, chloromethylsuccinic anhydride, 1,2-dicarboxylic - 4 - chlorocyclopentane anhydride, 1,2 - dicarboxylic - 4-octylcyclohexane anhydride, 1,2 - dicarboxylic - 5 - cyanocyclohexane anhydride, 1,2-dicarboxylic-4(2 - chloropentyl) - cyclohexane anhydride, bicyclo(2.2.1)-heptene-2,3-dicarboxylic anhydride, 7-oxabicyclo(2.2.1)-heptene-2,3 - dicarboxylic anhydride, cyclohexane - 1,2 - dicarboxylic anhydride, bicyclo(2.2.2)-octene-4,5-dicarboxylic anhydride, α,α - dimethylbenzylsuccinic anhydride, phthalic anhydride, hexahydrophthalic anhydride, 4 - endomethylenetetrahydrophthalic anhydride, methylbicyclo(2.2.1)heptene-2,3 - dicarboxylic anhydride (Nadic methyl anhydride), octadecylsuccinic acid anhydride.

The solid polyanhydride is prepared by the copolymerization of maleic anhydride with monoolefins. The monoolefins are defined in United States Patent No. 3,374,209 beginning at column 6, line 3 and extending to column 7, line 28, which disclosure is incorporated herein as a part of the present disclosure. The preferred monoolefin is an alpha-olefin represented by the following general formula:

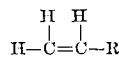

where R is hydrogen, halogen or a straight chain alkyl or halogenated alkyl radical having from 1 to about 18 carbon atoms.

It is understood that the term "olefin" is meant to include mixtures of monoolefins. While only one olefinic bond per molecule is present in the olefin since more than one double bond per molecule promotes gel formation and internal cross-linking, minor amounts of diolefins, of the order of two percent or less, can be tolerated.

Examples of olefin compounds or mixtures of olefins which are preferred to form the solid polyanhydride components of the compositions of this invention include: 1-propene, 1-butene, 1-pentene, 1-hexene, 1-heptene, 1-octene, 1-nonene, 1-decene, 5-chlorohexene-1, 1-undecene, 1-dodecene, 1-tridecene, 1-tetradecene, 1-octadecene, and mixtures thereof, etc.

A general formula for the solid polyanhydride can be represented by the general formula:

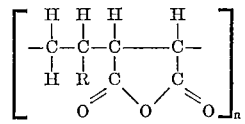

wherein $n$ is an integer of from 2 to about 100, R is hydrogen, halogen or a straight chain alkyl or halogenated alkyl group having from 1 to about 18 carbon atoms.

The copolymerization can be conducted in any suitable manner. One suitable copolymerization procedure involves contacting the olefinic compound with the maleic anhydride in a suitable solvent in the presence of a free radical producing catalyst, such as a peroxide. The molar ratio of the mono-alpha-olefin to maleic anhydride is desirably between about 1:1 and 3:1.

The temperature at which the copolymerization occurs is not critical and can generally vary between about 25° and 100° C. with a preferred reaction temperature between about 65° and 85° C. The lower limit on reaction temperature is determined by the temperature required to decompose the catalyst into free radicals. Thus, the lower reaction temperature will depend to a large extent on the catalyst employed. However, most free radical producing catalysts, such as the peroxides and others described below, are effective at temperatures as low as 25° C. unless a promoter, such as a ferrous, silver, sulfate or thiosulfate ion, is used, in which case much lower temperatures, i.e. —80° C., can be employed. The upper reaction temperature is determined by the boiling point of the components of the reaction mixture and the predominance of unwanted side reaction.

The reaction pressure should be sufficient to maintain the solvent in the liquid phase. Increased pressure, however, in addition to being an added expense, also promotes unwanted side reactions, such as polymerization of the olefinic compound. Pressures can therefore vary between about atmospheric and 100 p.s.i.g. or higher, but the preferred pressure is atmospheric.

The copolymers can be produced in any suitable solvent which at least partially dissolves both of the reaction components. Suitable solvents include, for example: n-pentane, n-hexane, n-octane, toluene, benzene, cumene, xylene, anisole, acetone, tetrahydrofuran, cyclohexane, n-propylacetate, ethylbenzene, di-n-butylether, n-amylacetate, cyclohexanone, bromobenzene, ethylbenzylether, etc., methylene chloride, di-isopropyl ether, carbon tetrachloride, methylcyclohexane, ethyl - n - butyrate, tetrachloroethylene, methylorthotolylether, methylethylketone.

The catalyst to employ can be any free radical producing material well known in the art. Preferred catalysts are the organic peroxides, such as benzoyl, lauryl and tertiary butyl peroxide. Other suitable free radical producing materials include substituted azo compounds, such as alpha-alpha'-azobis-isobutyronitrile.

The molecular weight of the polyanhydride component of the compositions of this invention affects the properties of the resulting resin and should, therefore, be controlled. Thus, the polyanhydride component should have a dilute solution viscosity (which is a measure of molecular weight) of five grams of the polyanhydride per deciliter of acetone at 77° F. between about 0.01 and about 2.0, preferably between about 0.03, and 0.95. Lower or higher values have been found to produce unsatisfactory castings, although such resins may be useful for other purposes.

An essential feature of the compositions of this invention is the solubilizing of the solid olefin-maleic anhydride copolymer in the clear, homogeneous mixture of the polyepoxide and monoanhydride to form a clear solution which can be cast and fully cured to a hard, clear resin having excellent properties. The time for solution of the polyanhydride in the monoanhydride-polyepoxide mixture varies depending on the ratio of the materials in the mixture, the temperature and, of course, the nature of the materials themselves. Thus, while the anhydride to epoxide ratio (A/E ratio) in the final mixture can vary, faster solution of the polyanhydride will occur at the lower A/E ratios.

The anhydride equivalent of the polyanhydride is defined as the average number of anhydride groups per molecule. In order to form thermosetting compositions of the present invention, the polyanhydride must have an anhydride equivalency of at least three, that is, the polyanhydride must have at least three anhydride groups per molecule. The anhydride group to epoxide group ratio, known more simply as the A/E ratio, can vary between about 0.1 and 1.5, but is preferably between about 0.3 and 1.0.

As used herein, the A/E ratio refers to the ratio of the total anhydride groups in the polyanhydride and the monoanhydride to the total epoxide groups in the polyepoxide. The quantity of monoanhydride used is between about 5.0 and 50.0 weight percent, more preferably between about 15.0 and 40.0 percent based on the total weight of the polyepoxide, monoanhydride and polyanhydride.

One of the features of the liquid compositions of this invention is that they can be cross-lniked or cured by the reaction of heat in the presence of an accelerator, such as N,N-dimethylbenzylamine. Thus, the cross-linking mechanism may be illustrated by the reaction of an accelerator with a first anhydride ring to form a carboxyl ion, which is then free to react with an epoxy group. The reaction between the carboxyl ion and the epoxy group generates another ion which may then open a second anhydride ring.

The time for curing or hardening of the liquid compositions of this invention will vary over a wide range, depending on the reactivity of the particular polyepoxides, monoanhydrides and polyanhydrides employed. The solution of the anhydrides in the polyepoxide, in general, will not cure at room temperature over reasonable lengths of time and either higher curing temperatures and/or an accelerator, as defined below, must be employed to increase the rate of curing.

Curing may take place in two stages, a first stage at a low temperature, for example, from about 70° C. to about 150° C., and a second stage at a higher temperature, for example, from about 180° C. to about 220° C. Both the first and second stage cures may be carried out for from about a few hours to about a few days, with about 20 to 30 hours being preferred.

While various materials, such as several Friedel-Crafts type salts, can accelerate the curing rate of the compositions of this invention, it has been found that soluble tertiary amines as a class are preferred in accelerating the curing of the compositions of this invention to solids of desired hardness. These tertiary amine accelerating agents are fully described in U.S. Patent No. 3,374,209 beginning at column 11, line 58 and extending to colum 13, line 38, which disclosure is incorporated herein as a part of the present disclosure. When an accelerator is used, we prefer to use N,N-dimethylbenzylamine or tris(dimethylaminomethyl)phenol.

The maximum amount of the tertiary amine accelerator to employ is not critical, while the minimum amount is critical. Amounts of from 0.1 to 10.0 parts of amine accelerator per 100 parts of liquid polyepoxide are satisfactory. The preferred range of accelerator concentration is between 0.3 and 3.0 parts of amine catalyst per 100 parts of polyepoxide. The more amine catalyst that is used, the faster the rate of cure. The curing is an exothermic reaction and when higher concentrations of amine are employed, it is preferred that means also be employed to remove the exothermic heat of reaction to avoid any possible charring of the product. The use of a tertiary amine accelerator results in much faster cures than if no accelerator is used.

The method of addition of the tertiary amine accelerators is critical. They must be added to the mixture of anhydrides and polyepoxide after the mono- and polyanhydrides are dissolved in the polyepoxide, since it normally takes longer to dissolve the anhydrides in the polyepoxide than for the amine accelerators to gel the mixture into an infusible mass. Consequently, if the amine is added first to the polyepoxide and the anhydrides added to this mixture the composition may gel before all of the anhydrides are dissolved, and a rubbery composition with inferior chemical and physical properties will result. As discussed above, a rubbery composition will also result if the copolymerized olefin-maleic anhydride polyanhydride is added to the polyepoxide before the monoanhydride is added thereto.

The temperature conditions under which the various resin components are to be mixed vary widely and are highly dependent upon the identity of the polyepoxide, mononanhydride, polyanhydride and accelerator being employed. Accordingly, it is difficult to define these limits with any degree of exactitude. However, with the aid of the broad temperature ranges discussed above and the specific ranges illustrated in the examples below, it will require no more than ordinary skill for an artisan to practice the invention.

Likewise, the pressure conditions which may be employed vary from subatmospheric to considerably above atmospheric, with about atmospheric pressure being preferred.

This invention will be further described with relation to the specific examples to be given below.

In the examples to follow, the polyanyhdride compound was prepared by the copolymerization of maleic anhydride and an alpha olefin having between 2 and 20 carbon atoms per molecule. These copolymers were prepared by reacting the desired olefin and maleic anhydride in a molar ratio of 2:1 in the liquid phase in the presence of a mutual solvent at a temperature between 60° and 100° C. using as a catalyst between 2 and 3 weight percent of benzoyl peroxide based on the maleic anhydride. The copolymer was then separated from the solvent and any residual catalyst and dried. Infrared analysis and nuclear magnetic resonance data indicated that the alph olefin and maleic anhydride combined in substantially a 1:1 molar ratio. Unless otherwise specified, the dilute solution viscosities of the copolymers used in the examples below, measured by dissolving the copolymer in the ratio of 5 grams to a deciliter of acetone, measured at 77° F., was between 0.01 and 2.0.

In preparing the casting in accordance with the invention the powdered olefin-maleic anhydride copolymer is mixed with the monoanhydride-polyepoxide mixture at an elevated temperature as described. This mixing step tends to incorporate air bubbles into the mixture which will be present in the solid casting if the curing occurs so rapidly after the mixing operation that the air is entrapped permanently in the resin. The process of mixing the accelerator into the mixture as described also tends to incorporate air bubbles into the mixture which will also be entrapped in the cured casting if the curing occurs too rapidly for the air bubbles to rise out of the mixture. It is therefore possible to produce clear, substantially bubble-free castings if the initial curing conditions are adjusted to permit evolution of entrapped air. This will be demonstrated in the following examples.

As used in the following examples, the meaning of certain abbreviations and phrases is as follows:

A/E=anhydride to epoxide ratio;

"Epon 828"=a lower molecular weight glycidyl ether produced by the condensation of epichlorohydrin with bisphenol A;

"Unox 201"=a cycloaliphatic polyepoxide containing more than one oxirane oxygen atom where at least one oxirane oxygen atom is directly connected to the carbon atoms in the ring;

PHR=parts by weight per hundred parts of polyepoxide;

DMBSA=α,α-dimethylbenzylsuccinic anhydride;
HDT=heat distortion temperature (ASTM D 648-56, 264 p.s.i.);
MAC$_x$=finely powdered maleic anhydride alpha-olefin copolymer, the $x$ referring to the number of carbon atoms in the alpha-olefin; e.g., MAC$_6$ is the copolymer of maleic anhydride and hexene-1;
DMBSA/MAC$_x$=anhydride ratios of monoanhydride/polyanhydride.

EXAMPLE 1

In two experiments 5.4 g. of MAC$_6$ and 10.4 g. of MAC$_{18}$ were each thoroughly mixed with 20 g. of "Epon 828" at an $A/E$ ratio of 0.3 in each sample. No accelerator was present. After 24 hours neither polyanhydride had dissolved and the epoxide had not hardened.

EXAMPLE 2

Two samples identical to those described above were prepared. Each sample was heated to 165° C. for one hour. Neither polyanhydride had dissolved after this heating.

EXAMPLE 3

In a sequential manner 11.1 g. of α,α-dimethylbenzylsuccinic anhydride, 6.75 g. of MAC$_6$ and 0.5 PHR of N,N-dimethylbenzylamine respectively were added to 20.0 g. of "Epon 828" at a constant temperature of 100° C. The $A/E$ ratio was 0.74 and the DMBSA/MAC$_6$ ratio 1.15. The solution gelled to a cloudy, rubbery substance with only a partial dissolution of the MAC$_6$ in the mixture. The cloudy appearance resulted from the undissolved MAC$_6$. A post cure could not improve this partially cured, rubber material.

Examples 4 through 10 disclose the preparation of good, clear castings in accordance with the invention using different combinations of polyepoxides, anhydrides and curing conditions.

EXAMPLE 4

In a small beaker 20.0 g. of "Epon 828" was mixed with 9.27 g. of α,α-dimethylbenzylsuccinic anhydride at room temperature and heated to 100° C. A clear, homogeneous mixture was obtained. The mixture was heated to 165° C. and 6.75 g. of MAC$_6$ was added with stirring. A clear, homogeneous solution resulted. The $A/E$ and DMBSA/MAC$_6$ of the solution were 0.74 and 1.15, respectively. The solution was cooled to 90° C. and 0.5 PHR of N,N-dimethylbenzylamine was added thereto with stirring. The solution was then poured into a mold for curing. The resin was cured at 100° C. for 24 hours. The HDT of the resulting casting was 96° C. The casting was clear and was almost completely free of air bubbles. On post curing an additional 24 hours at 200° C., the HDT was increased to 129° C.

EXAMPLE 5

The procedure of Example 4 was followed using 11.1 g. of α,α-dimethylbenzylsuccinic anhydride, 5.4 g. of MAC$_6$ and 20 g. of "Epon 828." This resulted in an $A/E$ ratio and DMBSA/MAC$_6$ ratio of 0.75 and 1.75, respectively. After cooling to 90° C., 0.5 PHR of N,N-dimethylbenzylamine was added. The resulting clear solution was poured into a mold and cured at 90° C. for 18 hours and at 150° C. for 24 hours. A good clear casting resulted which was substantially free of small air bubbles and had an HDT of 92° C. after the initial cure and 110° C. after the post cure.

EXAMPLE 6

The procedure of Example 4 was followed using 9.27 g. of α,α-dimethylbenzylsuccinic anhydride, 11.68 g. of MAC$_{18}$ and 20 g. of "Epon 828." The resulting clear, homogeneous solution had an $A/E$ of 0.71 and DMBSA/MAC$_{18}$ of 1.27. After adding 0.5 PHR of N,N-dimethylbenzylamine at 90° C., the solution was poured into a mold and cured at 90° C. for 16 hours. A good clear casting was obtained having an HDT of 65° C.

EXAMPLE 7

The procedure of Example 4 was followed using 9.27 g. of α,α-dimethylbenzylsuccinic anhydride, 11.68 g. of MAC$_{18}$ and 15.5 g. of "Unox 201." The resulting clear, homogeneous solution had an $A/E$ of 0.76 and an DMBSA/MAC$_{18}$ of 1.27. After adding 1.0 PHR of N,N-dimethylbenzylamine at 90° C., the solution was poured into a mold and cured at 90° C. for 24 hours. A good clear casting was obtained having an HDT of 104° C.

EXAMPLE 8

The procedure of Example 4 was followed using 11.13 g. of α,α-dimethylbenzylsuccinic anhydride, 5.4 g. of MAC$_6$ and 15.5 g. of "Unox 201." The resulting clear, homogeneous solution had an $A/E$ of 0.80 and a DMBSA/MAC$_6$ of 1.75. After adding 1.0 PHR of N,N-dimethylbenzylamine at 90° C., the solution was poured into a mold and cured at 90° C. for 24 hours. A good clear casting was obtained having an HDT of 110° C.

EXAMPLE 9

The procedure of Example 4 was followed using 9.27 g. of α,α-dimethylbenzylsuccinic anhydride, 11.68 g. of MAC$_{18}$ and 20.0 g. of "Epon 828." The $A/E$ ratio and DMBSA/MAC$_{18}$ ratio of the resulting clear, homogeneous solution was 0.85 and 1.27, respectively. This mixture was cured at 90° C. for 24 hours without an accelerator. A good, bubble-free casting was obtained having an HDT of 65° C.

EXAMPLE 10

The procedure of Example 4 was repeated using 9.27 g. of α,α-dimethylbenzylsuccinic anhydride, 11.68 g. of MAC$_{18}$ and 15.5 g. of "Unox 201" in an $A/E$ ratio of 0.76. A clear, homogeneous solution was obtained. This mixture was cured at 90° C. for 24 hours without an accelerator. A good, bubble-free casting was obtained having an HDT of 104° C.

EXAMPLE 11

The importance of employing a monoanhydride of the class defined above was illustrated by substituting maleic anhydride for α,α-dimethylbenzylsuccinic anhydride in the procedure of Example 4. Thus, 20.0 g. of "Epon 828" were stirred with 4.9 g. of maleic anhydride in a beaker at room temperature and heated to 165° C. To the heated mixture were added 6.75 g. of MAC$_6$. The $A/E$ and maleic anhydride/MAC$_6$ of the resulting mixture were 0.75 and 1.75/1, respectively. After heating the polyepoxide-maleic anhydride-MAC$_6$ mixture for only 45 minutes, and before the MAC$_6$ dissolved, the mixture gelled into an infusible, insoluble mass.

It is to be understood that the examples are merely illustrative of the principles of the present invention and that various modifications and changes may be made thereto without departing from the spirit and scope thereof as set forth in the following claims.

We claim:
1. A curable composition of matter comprising a solution of:
a copolymer of an olefin having between 2 and 20 carbon atoms and maleic anhydride having the structural formula:

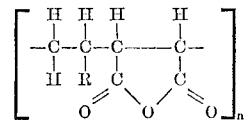

wherein $n$ is an integer of from 2 to about 100, R is hydrogen or a straight chain alkyl or halogenated alkyl group having from 1 to about 18 carbon atoms, said copolymer having a dilute solution viscosity of five grams of the polyanhydride per deciliter of acetone at 77° C. between about 0.01 and about 2 and at least three anhydride groups;

a monoanhydride having the structural formula:

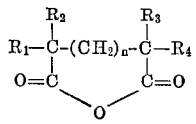

where the radicals $R_1$, $R_2$, $R_3$, and $R_4$ are independently hydrogen, halogen, hydrocarbon or substituted hydrocarbon radicals, and $n$ is zero or 1; and a polyepoxide having an average of more than one 1,2-epoxy group per molecule in which said monoanhydride is soluble, the amount of said polyepoxide being such that the total anhydride to total epoxide equivalents ratio is between about 0.1 and about 1.5, said solution containing between about 5 and 50 weight percent of the monoanhydride based on the total weight of the monoanhydride, the copolymer and the polyepoxide present in the solution.

2. The composition of claim 1 including a tertiary amine accelerator, the amount of said accelerator being at least about 0.5 parts per hundred parts of said polyepoxide.

3. The composition of claim 1 in which the monoanhydride is $\alpha,\alpha$-dimethylbenzylsuccinic anhydride.

4. The composition of claim 1 in which R is a straight chain alkyl group having from 1 to about 18 carbon atoms.

5. A process for producing the thermocurable composition of claim 1 which comprises intimately contacting said polyepoxide with said monoanhydride until a clear, homogeneous mixture is obtained, and mixing said mixture at an elevated temperature with said copolymer until a clear, homogeneous second mixture is obtained.

6. A process in accordance with claim 5 in which said temperature is between about 150° and about 190 C.

7. A process for making a clear casting which comprises curing the composition of claim 1 at an elevated temperature.

8. A process for making a clear casting which comprises curing the composition of claim 2 at an elevated temperature.

9. The clear homogeneous casting produced by the process of claim 7.

10. The clear, homogeneous casting produced by the process of claim 8.

11. The composition of claim 1 in which the copolymer has a dilute solution viscosity between about 0.03 and about 0.95, the total anhydride to total epoxide equivalents ratio is between about 0.3 and about 1.0 and the amount of monoanhydride to the total weight of the monoanhydride, the copolymer and the polyepoxide being between about 15 and 40 weight percent.

References Cited

UNITED STATES PATENTS

| | | | |
|---|---|---|---|
| 2,977,334 | 3/1961 | Zopf | 260—837 |
| 3,361,842 | 1/1968 | Applegarth | 260—836 |
| 3,374,209 | 3/1968 | Hay | 260—78.4 |
| 3,375,300 | 3/1968 | Ropp | 260—837 |

PAUL LIEBERMAN, Primary Examiner

U.S. Cl. X.R.

260—47 EA, 78.4 Ep, 78.5 R, 837 PV, 837 R